United States Patent [19]

Devona et al.

[11] Patent Number: 4,490,491

[45] Date of Patent: Dec. 25, 1984

[54] VINYLIDENE CHLORIDE-CONTAINING COPOLYMER LATICES

[75] Inventors: James E. Devona, Mt. Prospect; Martin L. Essigmann, Palatine, both of Ill.

[73] Assignee: DeSoto, Inc., Des Plaines, Ill.

[21] Appl. No.: 539,418

[22] Filed: Oct. 6, 1983

[51] Int. Cl.³ .............................................. C08F 26/06
[52] U.S. Cl. ..................... 523/318; 524/548; 524/555; 524/809; 524/813; 524/833
[58] Field of Search ................ 424/809, 833, 813; 526/329.4; 523/318

[56] References Cited

U.S. PATENT DOCUMENTS

| | | | |
|---|---|---|---|
| 3,483,154 | 12/1969 | Gibbs | 524/833 |
| 3,832,317 | 8/1974 | Mikofalvy | 526/329.4 |
| 3,922,451 | 11/1975 | Anschutz | 524/833 |
| 4,104,220 | 8/1978 | Sims | 524/809 |
| 4,111,877 | 9/1978 | Dixon | 524/809 |
| 4,429,095 | 1/1984 | Sandri | 524/809 |

FOREIGN PATENT DOCUMENTS 682007  2/1960  Canada ................................ 524/833

*Primary Examiner*—C. Warren Ivy
*Attorney, Agent, or Firm*—Dressler, Goldsmith, Shore, Sutker & Milnamow, Ltd.

[57] ABSTRACT

An aqueous latex is disclosed which possesses improved water resistance for use in exterior paints. This latex comprises an aqueous emulsion copolymer of monomers consisting essentially of from 15% to 40% of vinylidene chloride together with a mixture of at least about 20% of vinyl acetate and monoethylenic ester, preferably acrylic or methacrylic esters, which provide the copolymer with a glass transition temperature in the range of −10° C. to +10° C., these monomers including from about 0.1% to 10.0% of a monomer promoting adhesion. The copolymerization is carried out in aqueous emulsion at a pH of 3–6 and the vinylidene chloride is preferably introduced at or near the bottom of a reactor maintained at atmospheric pressure. It is also preferred to introduce the vinylidene chloride after polymerization has been initiated with the other monomers.

12 Claims, No Drawings

VINYLIDENE CHLORIDE-CONTAINING COPOLYMER LATICES

DESCRIPTION

1. Field of Invention

This invention relates to aqueous emulsion copolymers and latex paints containing the same having improved resistance to water vapor transmission, especially in combination with improved adhesion.

2. Background Art

Aqueous emulsion copolymers are commonly used in latex paints for painting homes, both exterior and interior. These paints are frequently based on aqueous emulsion copolymers which include a large proportion of vinyl acetate, an inexpensive monomer. Unfortunately, vinyl acetate-containing emulsion copolymers have poor resistance to water vapor transmission which causes difficulty. This difficulty becomes more pronounced as the proportion of vinyl acetate increases, and also as paints containing the emulsion copolymers are subjected to more rigorous use, as in exterior paints. Further, and especially when applied over previously applied oil-based paints, adhesion to the substrate is not satisfactory, and known adhesion-promoting monomers are poorly effective. The paint industry has long sought a practical way of avoiding these difficulties so that latex paints containing large amounts of vinyl acetate might be more satisfactorily employed.

DISCLOSURE OF INVENTION

In accordance with this invention, a mixture of monomers consisting essentially of from 15% to 40% of vinylidene chloride together with a mixture of at least about 20% of vinyl acetate and monoethylenic ester, such as acrylic or methacrylic esters illustrated by esters like n-butyl acrylate, which provide the copolymer with a glass transition temperature in the range of $-10°$ C. to $+10°$ C., preferably $-5°$ C. to $+5°$ C. and from about 0.1% to 10.0% preferably from 0.5%, of a monomer promoting adhesion, preferably a ureido-functional monomer, are copolymerized in aqueous emulsion. The aqueous medium is preferably acidic, having a pH in the range of pH 3-6. This mixture of monomers preferably includes from 0.1 to 5%, more preferably from 0.5 to 3%, of an ethylenically unsaturated monomer containing a ureido hydrogen atom. The result is an aqueous latex which can be formulated into latex paints which exhibit improved water resistance, as compared to a copolymer having the same glass transition temperature, but which does not contain the vinylidene chloride component. At the same time, yellowing introduced by the vinylidene chloride component is minimized due to the presence of a significant proportion of the acrylic monomers. Also, and when the specified amounts of the ureido monomer are incorporated into the copolymer in the preferred practice of this invention, the resulting latex and paints containing the same exhibit good adhesion to the surface being painted.

It will be understood that this provides an aqueous latex comprising an aqueous emulsion copolymer of monomers consisting essentially of from 15% to 40% of vinylidene chloride together with a mixture of at least about 20% of vinyl acetate and acrylic or methacrylic esters which provide the copolymer with a glass transition temperature in the range of $-10°$ C. to $+10°$ C., these monomers including from about 0.1% to 10.0% of a monomer promoting adhesion, all proportions being based on the total weight of monomers copolymerized. While the latex produced is acidic it is neutralized to a pH of 6.5 to 8.0 before being incorporated into a paint.

It should be appreciated that vinylidene chloride is an inexpensive monomer, like vinyl acetate, so the inclusion of a considerable proprotion of vinylidene chloride in place of vinyl acetate does not reduce the desired economy. However, even though vinylidene chloride has a boiling point below the desired polymerization temperature, this monomer can be introduced into the aqueous emulsion polymerization reactor, in the proportions used herein, at or near the bottom of the reactor without the need to close the reactor. This allows atmospheric pressure operation which provides a desirable economy. Still further, and in the proportions found to be effective herein, yellowing introduced by the vinylidene chloride component is minimized, as noted previously, and this minimal yellow coloration is easily masked by normal pigmentation of the paint.

It should also be understood, that adhesion promoting monomers which include a ureido hydrogen atom are themselves well known and subject to considerable variation, as will be discussed. However, when typical monomers of this character are incorporated into typical latices which include large amounts of vinyl acetate, the adhesion on exterior exposure (especially over old oil-based paints) is only slightly improved. However, when the vinylidine chloride monomer is incorporated into the same copolymer, adhesion is considerably improved using the same ureido monomers.

The glass transition temperatures referred to are determined by measurement (differential thermal analysis). This is more accurate than calculation for vinylidene chloride-containing copolymers.

It will be appreciated that the aqueous emulsion copolymerization is itself well known and is illustrated in the examples. Appropriate concentrations, surfactants, catalysts and operating procedures are mostly conventional. It is a feature of this invention that one can economically produce the latices under consideration at atmospheric pressure using conventional polymerization temperatures. Polymerization is conveniently carried out at temperatures in the range of 20° C. to 80° C., about 60° C. being preferred herein. Another feature of this invention is that the vinylidene chloride addition to the polymerization is delayed until after polymerization has been established by the presence of the other monomers.

It is preferred to use vinyl acetate in an amount of from 20% to 50%, more preferably from 30%, to 40%. As previously indicated, once the proportion of vinylidene chloride is selected, the glass transition temperature determines how the balance of the monomers can be selected, having regard for the presence of at least abut 20% of vinyl acetate.

The third essential monomer is a monoethylenic ester, most preferably an acrylic or methacryic ester with an alkanol having from 2–8 carbon atoms, most preferably a butyl acrylate such as n-butyl acrylate, isobutyl acrylate, 2-ethyl hexyl acrylate and methacrylate will further illustrate the monoethylenic esters which will lower the excessively high $T_g$ provided by the vinylidene chloride and vinyl acetate components of the copolymer. The selection and proportion of the monoethylenic ester or mixture of esters functions to lower the glass transition temperature into the defined range, so this determines how much of which monomer can be present.

Many patents describe the adhesion-promoting monomers which may be used herein and which contain a ureido hydrogen atom. These monomers are preferably derived from ethylene urea which is linked in some way to a copolymerizable ethylenic group. The monomers with a single ethylenic group are preferred, but this is not essential since polyethylenic derivatives are also effective to promote adhesion and do not cause difficulty in the copolymer in the small amounts needed to enhance adhesion.

It is particularly preferred to include in the copolymer a ureido-functional adhesion promoting monomer which is a derivative of ethylene urea, such as the reaction product of 2-hydroxyethyl ethylene urea with one molar proportion of maleic anhydride and then with one molar proportion of 1,2propylene oxide, or the reaction product of 2-hydroxyethyl ethylene urea with one molar proportion of 1,2-propylene oxide and then with one molar proportion of allyl glycidyl ether, or the reaction product of 2-aminoethyl ethylene urea with one to two molar proporitons of allyl glycidyl ether, or the reaction product of 2-aminoethyl ehtylene urea with one molar proportion of an epoxy ester, such as the glycidyl ester of neodecanoic acid, and then with one molar proportion of allyl glycidyl ether. These ureido-functional adhesion-promoting monomers are the subject of many U.S. patents, particular reference being made to U.S. Pat. Nos. 3,356,653 3,509,085 4,151,142 and 4,319,032.

Throughout this application, and in the examples and claims which follow, all proportions are by weight, unless otherwise specified.

EXAMPLE 1

A monomer pre-emulsion having the following composition is prepared:

| Parts (wet) | component |
| --- | --- |
| 747.0 | Deionized water |
| 17.9 | Sodium salt of a sulfonated octyl phenol polyethoxylate containing 2 molar proportions of adducted ethylene oxide (28% solids in water) [Triton X-200 from Rohm & Haas may be used] |
| 42.9 | Octyl phenol adducted with 40 molar proportions of ethylene oxide (70% solids in water) [Triton X-405 supplied by Rohm & Haas may be used] |
| 30.0 | Nonyl phenol adducted with 9.5 molar proportions of ethylene oxide (Triton N-101 supplied by Rohm & Haas may be used) |
| 50.0 | Adhesion promoting monomer (reaction product of 2-hydroxyethyl ethylene urea with one molar proportion of maleic anhydride and then with one molar proportion of 1,2-propylene oxide) [80% in water] |
| 650.0 | Vinyl acetate |
| 800.0 | n-Butyl acrylate |
| 10.0 | Acrylic acid |
| 21.4 | t-Butyl hydroperoxide (70% active) |
| 10.0 | Sodium bicarbonate |

A reductant solution is made by dissolving 9.37 parts of sodium formaldehyde sulfoxylate in 107.8 parts of deionized water.

A five liter four-neck flask, equipped with a paddle stirrer, a water-cooled condenser in tandem with an ice-filled cold finger condenser, a nitrogen inlet, and three stainless steel addition tubes which extend to the bottom of the reactor, is suspended in a water bath capable of being heated to about 60° C.

The flask is pre-charged with 748.0 parts of deionized water and 1.0 part of a solution containing 860 ppm iron as iron-ethylene diamine tetraacetic acid complex. The water bath is heated to 60° C., and when the pre-charge temperature has stabilized, 1 part of the reductant solution is added to the flask. Immediately, the pre-emulsion and the remaining reductant solution are slowly added to the flask at a rate that requires 4 to 5 hours for the total addition. The temperature in the flask increases over the first 30 minutes, at which time a third addition is begun consisting of 511.0 parts of vinylidene chloride (inhibited with 200 ppm of methyl hydroquinone). The vinylidene chloride is added slowly such that all of it is added over a 3 to 4 hour period. The contents of the flask are at an acid pH.

It is often observed that the beginning of the vinylidene chloride addition inhibits the polymerization, causing the flask temperature to drop. If the flask temperature falls below that of the water bath, vinylidene chloride addition is stopped while the other additions are continued until the exotherm resumes, and the vinylidene chloride addition is then continued.

After the vinylidene chloride addition is complete, the pre-emulsion and reductant additions are continued until they are also complete, and the polymerization conditions are maintained for an additional 30 minutes. At the end of this period, a sample of the latex is removed and tested for free vinyl acetate using saturated bromine water titration. If free vinyl acetate exceeds 0.2% (w/w), a post addition is made of 1.25 part of t-butyl hydroperoxide (70% active) and 6.00 parts of sodium formaldehyde sulfoxylate solution (8% active). After 15 minutes of additional reaction, the free vinyl acetate content is measured, and this procedure is repeated until the measurement shows less than 0.2% free vinyl acetate.

The final product is a latex with a non-volatile content of 53.7%, a particle size of 0.23 micron determined by specific turbidity measured from 5000 to 8000 angstrom units, a pH of 3.75, a minimum film forming temperature slightly below 1° C., and a weight per gallon of 9.31 pounds. The final product of this example has a vinylidene chloride content of 25.4% based on total copolymer.

EXAMPLE 2

A monomer pre-emulsion of the following composition was prepared:

| Parts (wet) | component |
| --- | --- |
| 752 | Deionized water |
| 17.9 | Sodium salt of a sulfonated octyl phenol polyethoxylate containing 2 molar proportions of adducted ethylene oxide (28% solids in water) [Triton X-200 from by Rohm & Haas may be used] |
| 42.9 | Octyl phenol adducted with 40 molar proportions of ethylene oxide (70% solids in water) [Triton X-405 supplied by Rohm & Haas may be used] |
| 30.0 | Nonyl phenol adducted with 9.5 molar proportions of ethylene oxide (Triton N-101 supplied by Rohm & Haas may be used) |
| 22.3 | Adhesion promoting monomer (the reaction product of 2-aminoethyl |

| Parts (wet) | component |
|---|---|
| | ethylene urea with one molar proportion of allyl glycidyl ether at 90% solids in water) |
| 674.0 | Vinyl acetate |
| 800.0 | n-Butyl acrylate |
| 21.4 | t-Butyl hydroperoxide (70% active) |
| 10.0 | Sodium bicarbonate |

A reductant solution is made by dissolving 9.1 parts of sodium formaldehyde sulfoxylate in 104.2 parts of deionized water.

The polymerization flask is pre-charged with 748 parts of deionized water and 1.0 part of a solution containing 860 ppm iron as iron-ethylene diamine tetraacetic acid complex, and the procedure of Example 1 was repeated using 502.0 parts of vinylidene chloride. The latex so-produced had a non-volatile content of 53.7%, a particle size of 0.34 micron, a weight per gallon of 9.24 pounds, a pH of 4.4, and a vinylidene chloride content of 25.1%.

EXAMPLE 3

Example 1 is repeated with these changes:

1-the pre-emulsion contained 780 parts of water, 760 parts of vinyl acetate, 810 parts of n-butyl acrylate, and 14.3 parts of t-butyl hydroperoxide solution;

2-the reductant solution contained 6.4 parts of sodium formaldehyde sulfoxylate in 74.2 parts of water; and 3-the total vinylidene chloride addition was 394 parts.

By following the procedure used in example 1, a latex is produced with a non-volatile content of 54.4%, a particle size of 0.23 micron, a weight per gallon of 9.24 pounds, a pH of 4.3, and a vinylidene chloride content of 19.6%.

EXAMPLE 4

The latex of Example 1 was used to make an exterior paint of the following formulation. Prior to use, the latex waas neturalized to pH 6.7 with 28% ammonium hydroxide.

| Parts (wet) | component |
|---|---|
| 1.0 | Attapulgite clay |
| 17.0 | Propylene glycol |
| 9.0 | Sodium salt of polyacrylic acid (Tamol 960 may be used) |
| 3.0 | Octyl phenol adducted with 10 molar proportions of ethylene oxide and etherified to provide the benzyl ether (Triton CF-10 supplied by Rohm & Haas may be used) |
| 3.0 | Tetra potassium pyrophosphate |
| 225.0 | Titanium dioxide, rutile |
| 85.0 | Mica |
| 100.0 | Amorphous silica |
| 4.0 | Hydroxyethyl cellulose |
| 300.0 | Latex of Example 1 - pH 6.7 |
| 8.0 | 2,2,4-Trimethylpentandiol-1,3 monoisobutyrate |
| 380 | Deionized water |

When the above components are milled together, a paint is provided which has application properties comparable to those of commercial paints based on all acrylic emulsion copolymers. However, the paint of this example exhibited a six-fold improvement in scrub resistance and a much improved water resistance as determined by water-induced lifting of a film cast on polyethylene.

EXAMPLE 5

The latex of Example 2 was used in the exterior paint formulation of Example 4 to produce a latex paint, the exception being that the emulsion copolymer was neutralized to pH 7.1. The product of this example had the same good application properties obtained in Example 4, but in comparison with the commercial all acrylic paints it exhibted a four-fold improvement inscrub resistance, a significant improvement in slide and peel wet adhesion, and improved water resistance as determined by water-induced lifting of a film cast on polyethylene.

EXAMPLE 6

The latex of Example 3 neutralized to pH 6.9 was used in the exterior paint formulation of Example 4 to produce a latex paint. The product of this example had the same good application properties obtained in Example 4, but in comparison with the commercial all acrylic paints it exhibited an eight-fold improvement in scrub resistance, and a slight improvement in water resistance as determined by water-induced lifting of a film cast on polyethylene.

What is claimed is:

1. An aqueous latex comprising an aqueous emulsion copolymer of monoethylenically unsaturated monomers consisting essentially of from 15% to 40% of vinylidene chloride together with a mixture of at least about 20% of vinyl acetate and monoethylenic acrylate or methacrylate ester with an alkanol containing from 2-8 carbon atoms providing the copolymer with a glass transition temperature in the range of $-10°$ C. to $+10°$ C., said monomers including from about 0.1% to 10.0% of an adhesion promoting monomer which contains a ureido hydrogen atom, said proportions being based on the total weight of monomers copolymerized.

2. A latex as recited in claim 1 in which said monomers are provided in aqueous emulsion having a pH in the range of 3-6.

3. A latex as recited in claim 1 in which said adhesion promoting monomer is a monoethylenically unsaturated derivative of an ethylene urea present in amount of 0.5% to 3%.

4. A latex as recited in claim 1 in which said vinyl acetate is present in an amount of from 20% to 50%.

5. A latex as recited in claim 3 in which said vinyl acetate is present in an amount of from 30% to 40%.

6. A latex as recited in claim 1 in which said ester is n-butyl acrylate used in a proportion which provides a glass transition temperature in the range of $-5°$ C. to $+5°$ C.

7. An aqueous latex comprising an aqueous emulsion copolymer of monomers consisting essentially of from 15% to 40% of vinylidene chloride together with a mixture of 30% to 40% of vinyl acetate with acrylic or methacrylic esters with an alkanol containing from 2-8 carbon atoms which provides the copolymer with a glass transition temperature in the range of $-5°$ C. to $+5°$ C., said monomers including from about 0.5% to 3.0% of a monoethylenically unsaturated derivative of ethylene urea providing a ureido hydrogen atom, said proportions being based on the total weight of monomers copolymerized.

8. an aqueous latex paint comprising the latex of claim 1.

9. An aqueous latex paint as recited in claim 9 in which said latex is neutralized to a pH of 6.5-8.0.

10. A method of providing an aqueous latex characterized by superior resistance to water vapor transmission comprising, copolymerizing in aqueous emulsion monomers consisting essentially of from 15% to 40% of vinylidene chloride together with a mixture of at least about 20% of vinyl acetate and acrylic or methacrylic esters with an alkanol containing from 2-8 carbon atoms which provide the copolymer with a glass transition temperature in the range of −10° C. to +10° C., said monomers including from about 0.1% to 10.0% of an adhesion promoting monomer which contains a ureido hydrogen atom, said proportions being based on the total weight of monomers copolymerized, and said copolymerization being carried out at a pH in the range of pH 3-6.

11. A method as recited in claim 10 in which said polymerization is carried out at atmospheric pressure in an open reactor at a temperature above the boiling point of vinylidene chloride, and said vinylidene chloride is introduced into the polymerization reactor at or near the bottom thereof.

12. A method as recited in claim 10 in which the addition of vinylidene chloride is delayed until after the polymerization has been initiated with the other monomers.

* * * * *

UNITED STATES PATENT AND TRADEMARK OFFICE
CERTIFICATE OF CORRECTION

PATENT NO. : 4,490,491

DATED : December 25, 1984

INVENTOR(S) : James E. Devona and Martin L. Essigmann

It is certified that error appears in the above-identified patent and that said Letters Patent is hereby corrected as shown below:

Column 1, line 40, after "0.5%", add --to 5%--.

Column 2, line 61, after "acrylate" and before the comma, insert --. Ethyl acrylate--.

Column 3, line 18, "1,2propylene" should read --1,2-propylene--.

Column 6, line 11, "inscrub" should read --in scrub--.

Claim 9, line 1, change the claim dependency from "9" to --8--.

Signed and Sealed this

Sixteenth Day of April 1985

[SEAL]

Attest:

DONALD J. QUIGG

*Attesting Officer*     *Acting Commissioner of Patents and Trademarks*